2,494,582

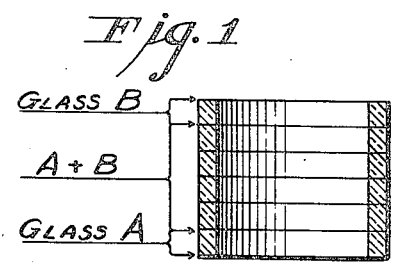
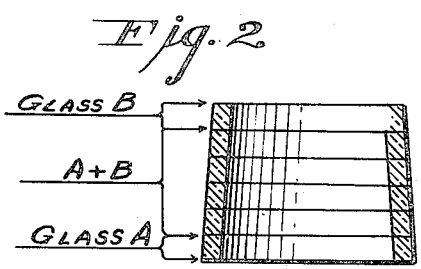
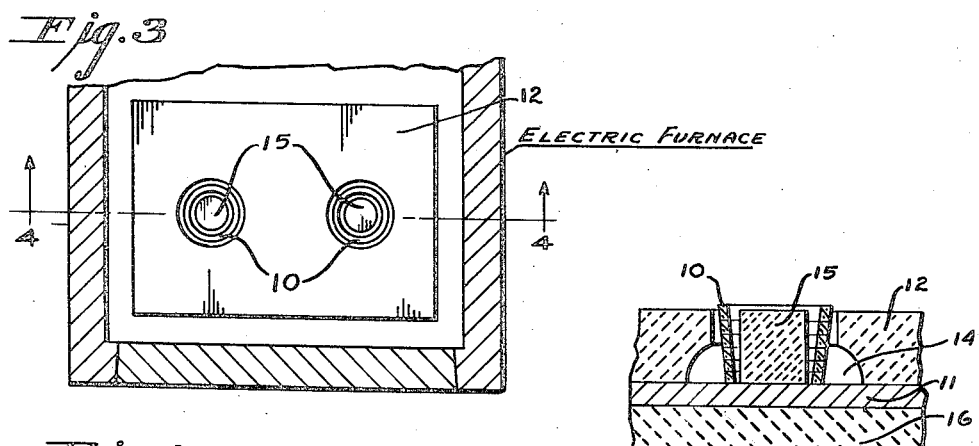
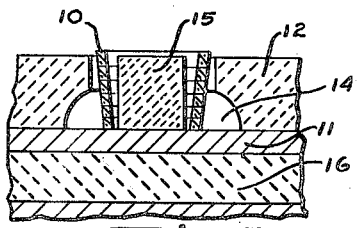
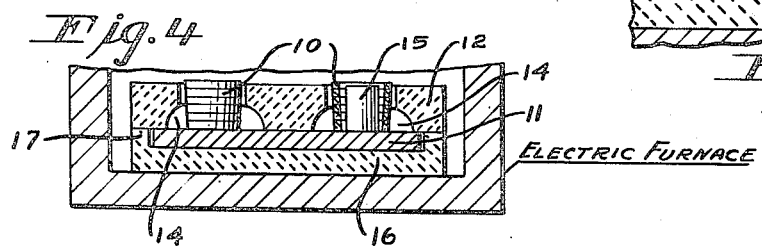
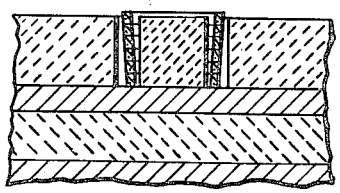
Inventor
JAMES CHARLES PROKOPEC
Attorney Patented Jan. 17, 1950

UNITED STATES PATENT OFFICE 2,494,582

METHOD FOR FIRING GRADED GLASS TUBULAR SEALS

James Charles Prokopec, Corning, N. Y., assignor to Corning Glass Works, Corning, N. Y., a corporation of New York Application August 9, 1944, Serial No. 548,740

3 Claims. (Cl. 49—82)

This invention relates to methods of making graded glass seals, particularly tubular graded seals, for use in joining glasses having widely different thermal expansion coefficients. As is well known, such seals are composed of a series of glasses joined together by fusion, the thermal expansion coefficient of each glass differing from that of the adjoining glasses by an amount insufficient to cause the establishment of breaking stresses and varying progressively from the lowest to the highest in the series.

Tubular graded seals are usually made by joining short lengths of glass tubing having the desired range of expansion coefficients by careful fusion and manipulation in a flame. This is a slow laborious process requiring great manual skill and it requires a complete series of glasses having the characteristics necessary to bridge the thermal expansion difference desired. Due to the scarcity of glasses to provide steps between quartz glass or fused silica and commercial glasses of the lowest thermal expansion coefficient, graded seals for joining fused silica and ordinary glasses are not readily made by this method.

Tubular graded seals have also been made by firing porous glass tubing of high silica content impregnated with salts or compounds of boron and/or alkali metals in a tubular gradient furnace having a progressively varying temperature throughout its length. Such gradient furnaces cannot be constructed or controlled so as to provide temperature gradients of 500° C. or more through the short distance of about one inch or less as required for short graded seals.

Graded seals are highly desirable which are composed of two pulverized glasses intimately mixed in progressively varying proportions and molded into shape by a method such as is set forth in Patent 2,390,354 issued December 4, 1945, to Charles W. Clapp and assigned to the assignee of this invention. However, such seals heretofore could not successfully be fired to produce a uniformly symmetrical vitreous tube, due to the relatively large shrinkage of the powdered glass on sintering and to the wide range of softening temperatures between the two glasses which resulted in severe distortion despite the use of gradient heating.

The primary object of this object of this invention is to provide a method of making graded seals rapidly and economically.

Another object is to make uniformly symmetrical short tubular graded seals.

A further object is to make tubular graded seals which will bridge the expansion difference between quartz glass or fused silica and ordinary low expansion glasses or the expansion difference between glasses of low expansion and those of high expansion.

Another object is to fire a molded pulverized glass article having graded expansion characteristics and softening temperatures.

Still another object is to fire a tubular graded seal of molded pulverized glass without distortion thereof.

The above and other objects may be accomplished by practicing my invention, which in its broader aspect comprises exposing the portion of the molded article having the highest softening temperature to a source of radiant heat having a substantially uniform temperature in the neighborhood of said softening temperature while partially shielding the lower-softening portions of the article and extracting heat therefrom in proportion to their softness.

In order that the invention may better be understood, reference is had to the accompanying drawing in which:

Fig. 1 is a sectional view of a tube molded from a series of mixtures of two pulverized glasses designated A and B respectively.

Fig. 2 is a sectional view of the tube shown in Fig. 1 after being fired near the softening temperature of glass B.

Fig. 3 is a plan view of a heat-protective apparatus containing tubular graded seals of molded pulverized glass to be differentially fired in accordance with my invention.

Fig. 4 is a sectional view on the line 4—4 of Fig. 3, showing the apparatus within a radiant electric furnace.

Fig. 5 is an enlarged fragmentary sectional view of the apparatus of Figs. 3 and 4.

Fig. 6 is an enlarged fragmentary sectional view of a modification of the apparatus shown in Fig. 5.

In the various figures the same marks of reference are used to designate the same parts.

My invention is applicable to molded glass articles having progressively varying softening temperatures and composed of any desired pair or combination of pulverized glasses having different thermal expansion coefficients and the following description refers, by way of example only, to tubes composed of pulverized mixtures of glasses A and B which I have used and which have the following physical properties:

| | Glass A | Glass B |
|---|---|---|
| Expansion Coefficient | $8 \times 10^{-7}$ | $37.5 \times 10^{-7}$ |
| Softening Temperature | 1450° C. | 750° C. |

Graded seals made from such a combination of glasses are suitable for joining fused silica and low expansion borosilicate glasses.

As shown in Fig. 1, a short tubular graded seal composed of molded pulverized glass to be fired in accordance with my invention may consist of mixtures of glasses A and B in proportions varying progressively from glass A alone at one end of the tube to glass B alone at the other end of the tube.

In Figs. 3, 4, and 5 a plurality of short tubular graded seals 10 composed of molded pulverized glass are supported on a plate 11 composed of a heat conducting material having a high heat capacity such as metal, and preferably a non-scaling metal such as the alloy known as "Alleghany 55." A slab 12 composed of an insulating ceramic refractory material and provided with holes slightly larger than the tubular graded seals is located above the plate 11 so that the tubular graded seals 10 stand loosely in the holes. The thickness of the slab 12 is preferably slightly less than the length of the graded seals 10 so that the uppermost ends of the tubes will project somewhat above the surface of the slab 12. On the under side of the slab 12 the holes preferably are countersunk or enlarged so as to provide a heat radiating and convecting space 14 around the lower end of each graded seal. The depth to which the space 14 is countersunk is normally about one-half the length of the tube 10, but if the softer end of the tube is made proportionately longer than the harder end of the tube, as is sometimes the case, the depth of the space 14 should be increased. The holes may, in some instances, be provided with a straight bore as shown in Fig. 6 when the length of the tube is very short. Within the tubular seals 10 preferably are placed small cylinders 15 of insulating refractory material, which are preferably somewhat shorter than the tubular seals 10 and slightly smaller in diameter. If desired, the cylinders 15 may be omitted from tubular seals having an inside diameter as small as one-half inch or less. The plate 11 bearing the tube 10 is supported on a base slab 16 of insulating ceramic refractory material provided with up-standing side walls 17 which support the slab 12, the under side of the slab 12 being preferably in contact or close proximity with the plate 11.

In carrying the invention into practice tubular graded seals, composed and molded from mixtures of pulverized glass, as indicated in Fig. 1, are subjected to a preliminary firing at a temperature near the softening temperature of glass B to eliminate organic matter. The time and temperature should be just sufficient to cause the upper end of the tubular seals to partially sinter, the tube being in such position that its softest portion is uppermost. Such treatment results in a slight shrinkage of the softer end of the tube as shown in Fig. 2.

Tubular graded seals of the type shown in Fig. 2, after a preliminary heat treatment, are placed on the metal plate 11 and base slab 16 with their shrunken or softer end in contact with the plate 11. The refractory slab 12 and the refractory cylinders 15 are placed in position, as shown in Figs. 4 and 5, and the assembly is heated from above, preferably by being introduced into a preheated furnace, such as an electric furnace having the heating element positioned above the assembly. For tubular seals composed of glasses A and B in the proportions set forth in Figs. 1 and 2, the temperature of the furnace should be 1450° C. and the graded seals should be thus heated for about fifteen minutes. Combinations of other glass compositions having expansion coefficients and softening temperatures different from those of glasses A and B will require different times and/or temperatures, but in general the final firing temperature should be near the softening temperature of the uppermost end of the tube or the end composed of the glass mixture having the highest softening temperature.

During the final firing step, the uppermost end of the molded glass tube 10 is exposed to the full radiant energy of the heat source, but the lowermost end and the intermediate portions of the tube 10 are shielded from the direct radiation of the furnace by the refractory slab 12 and cylinder 15. Although the slab 12 and the cylinder 15 tend to soak up heat and become highly heated throughout, the time required for the sintering of the uppermost end of the tube 10 is insufficient for them to attain the maximum temperature throughout. Consequently a constantly decreasing temperature gradient will exist between the top and bottom of the slab 12 and likewise of the cylinder 15 and radiation therefrom will subject the tube 10 to a similar temperature gradient which decreases towards the lowermost end of the tube 10.

I have found that in order to prevent the lowermost or softer end of the tube 10 from thus becoming overheated during the time necessary to sinter the uppermost or harder end of the tube 10, it is necessary to provide the plate 11 which acts to conduct some of the excess heat from the lowermost end of the tube 10 which is in contact therewith. Failure to make such a provision results in fusion and collapse of the lowermost end of the tube 10.

I have further found that the intermediate or central portion of the tube 10 may also become overheated in the time required for sintering the upper end thereof unless the radiating space 14 is provided whereby excess heat from the intermediate portion of the tube 10 is radiated and convected to the plate 11 and thereby conducted away. The bottom slab 16 and side walls 17 serve to protect the plate 11 from becoming too highly heated from below and thereby to ensure its efficient functioning.

Thus it will be seen that in order to subject all portions of the tube 10 to the temperature and time necessary for its proper sintering, the harder end is heated at or near its softening temperature while heat is extracted from the softer portions in proportion to their softness.

It will be apparent that the temperature gradient to which the intermediate or central portion and the lowermost end of the tube 10 are subjected during the time necessary to sinter its uppermost end can be varied somewhat by varying the thickness and/or the composition of the slab 12 and the plate 11. Also, the temperature and time of treatment may be varied. For example, good results may be obtained by subjecting the tubes 10 in their protective apparatus to a higher temperature for a shorter time, provided the harder uppermost ends of the tubes 10 do not project above the slab 12. Such variations are contemplated by me and are intended to be within the scope of the invention as claimed.

Moreover, the preliminary firing step may, if desired, be omitted and an unsintered tube such as is shown in Fig. 1 may be placed in the apparatus shown in Figs. 3, 4, 5 and 6, and fired, as described above. However, such a procedure might result in undue breakage of the relatively weak unfired tubes in handling and also may not completely eliminate organic material used in bonding and molding the pulverized glass.

I claim:
1. The method of firing a tube composed of molded powdered glass and varying in composition from a high softening temperature glass at one end of the tube to a substantially lower softening temperature glass at the other end, which includes exposing the portion of the tube having the highest softening temperature to a source of heat external of the tube and having a temperature in the neighborhood of said highest softening temperature while substantially preventing heat from reaching the lower softening portions of the tube except by conduction through the tube.

2. The method of firing a tube composed of molded powdered glass and varying in composition from a high softening temperature glass at one end of the tube to a substantially lower softening temperature glass at the other end, which includes exposing the portion of the tube having the highest softening temperature to a source of heat external of the tube and having a temperature in the neighborhood of said highest softening temperature while shielding the lower softening portions of the tube from direct heat from said source but indirectly heating them by conduction through the tube and conducting heat away from the lowest softening portion.

3. The method of firing a tube composed of molded powdered glass and varying in composition from a high softening temperature glass at one end of the tube to a substantially lower softening temperature glass at the other end, which includes heating the tube to a temperature and for a time to at least partially sinter the portion having the lowest softening temperature, and thereafter exposing the portion of the tube having the highest softening temperature to a source of heat external of the tube and having a temperature in the neighborhood of said highest softening temperature while shielding the lower softening portions of the tube from direct heat from said source but indirectly heating them by conduction through the tube and conducting heat away from the lowest softening portion.

JAMES CHARLES PROKOPEC.

REFERENCES CITED

The following references are of record in the file of this patent:

UNITED STATES PATENTS

| Number | Name | Date |
|---|---|---|
| 1,014,757 | Keyes et al. | Jan. 16, 1912 |
| 1,173,688 | Thompson | Feb. 29, 1916 |
| 1,960,121 | Moulton | May 22, 1934 |
| 2,026,370 | Winkler | Dec. 31, 1935 |